United States Patent [19]

Chipchase

[11] 3,857,477

[45] Dec. 31, 1974

[54] TRAY TURNOVER DEVICE

[75] Inventor: Frank D. Chipchase, West Milford, N.J.

[73] Assignee: International Multifoods Corporation, Minneapolis, Minn.

[22] Filed: Aug. 24, 1972

[21] Appl. No.: 283,532

[52] U.S. Cl............................... 198/155, 198/158
[51] Int. Cl............................................ B65g 17/00
[58] Field of Search .......... 198/158, 183, 145, 155, 198/148, 203; 74/209

[56] References Cited
UNITED STATES PATENTS

| | | | |
|---|---|---|---|
| 844,806 | 2/1907 | Jones | 198/158 |
| 2,323,920 | 7/1943 | Knudsen | 198/145 |
| 2,661,627 | 12/1953 | Johnston | 74/209 |
| 2,919,824 | 1/1960 | Roth | 198/155 |
| 2,925,902 | 2/1960 | Bianchi | 198/158 |

FOREIGN PATENTS OR APPLICATIONS

| | | | |
|---|---|---|---|
| 202,061 | 2/1959 | Germany | 198/145 |

Primary Examiner—Evon C. Blunk
Assistant Examiner—Joseph E. Valenza
Attorney, Agent, or Firm—Merchant, Gould, Smith & Edell

[57] ABSTRACT

Tray turnover apparatus for conveying and discharging bakery products following proofing or cooling. The apparatus consists of a plurality of tray turnover devices which are adapted to carry the bakery products and which are sequentially moved over a discharge area by a conveyor. Each tray turnover device is turnable or tiltable about a horizontal axis from a normally upright position to a discharge position, and includes a wheel member which is rotatable to cause the carrying tray to turnover to the discharge position. A motor driven disc at the discharge area is disposed to rotatably engage each wheel member as the tray turnover devices pass by, thereby turning each carrying tray over to the product discharge position. Rotational speed of the drive disc is variable to control the tray turnover speed for products having different sticking consistencies, and means are included for maintaining the carrying tray in the discharge position to insure product discharge. Each tray turnover device also includes improved means for removably holding a cloth cover to the tray body, which enables simple and convenient removal of the cover for washing or discarding.

5 Claims, 6 Drawing Figures

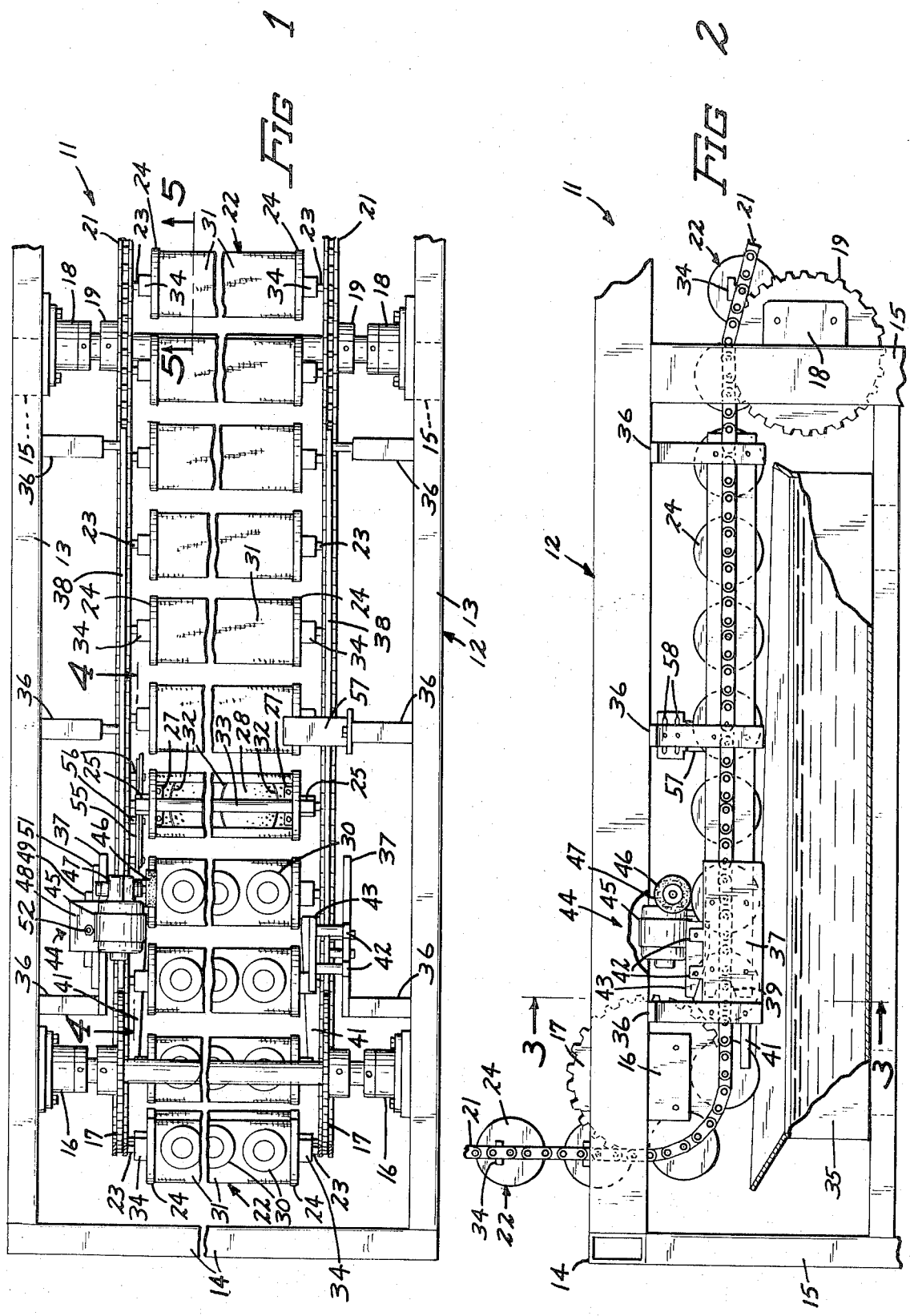

PATENTED DEC 31 1974  3,857,477
SHEET 2 OF 2
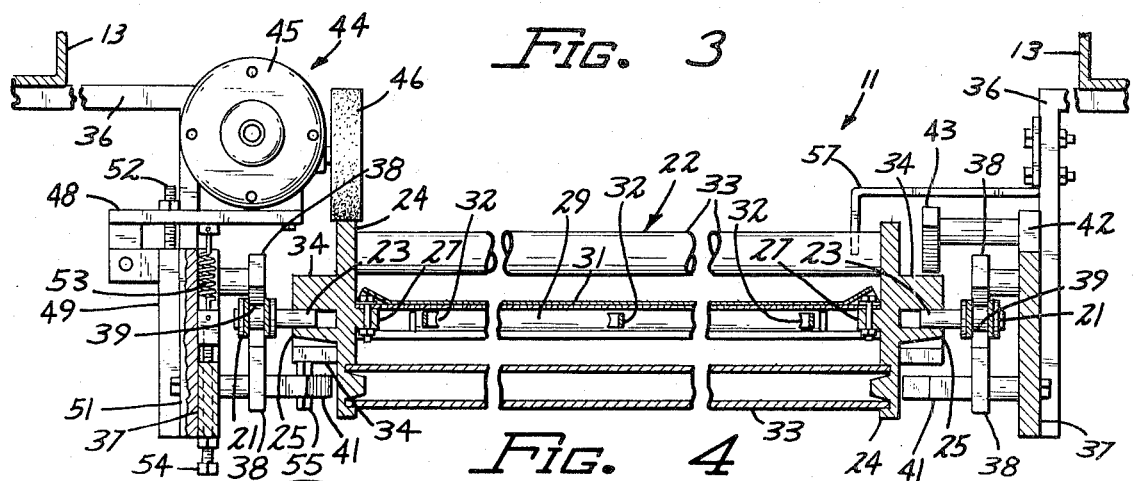
FIG. 3
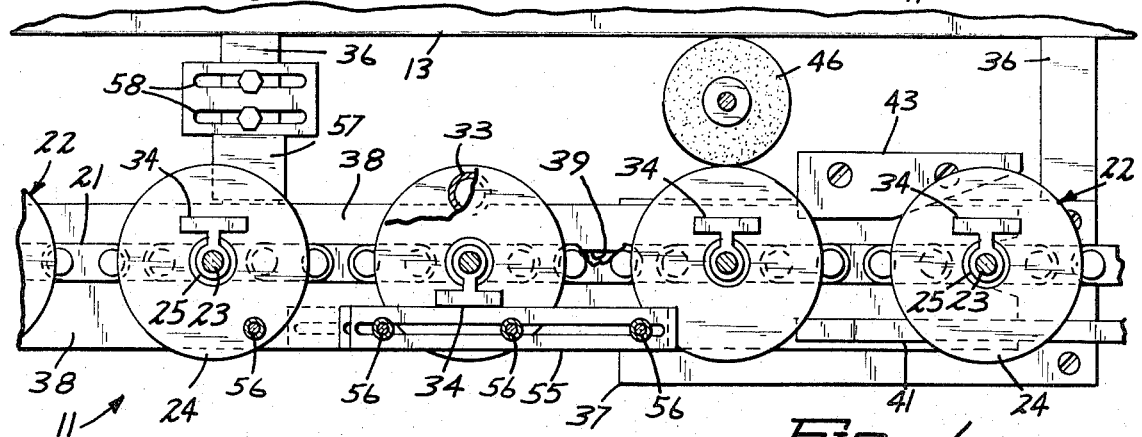
FIG. 4
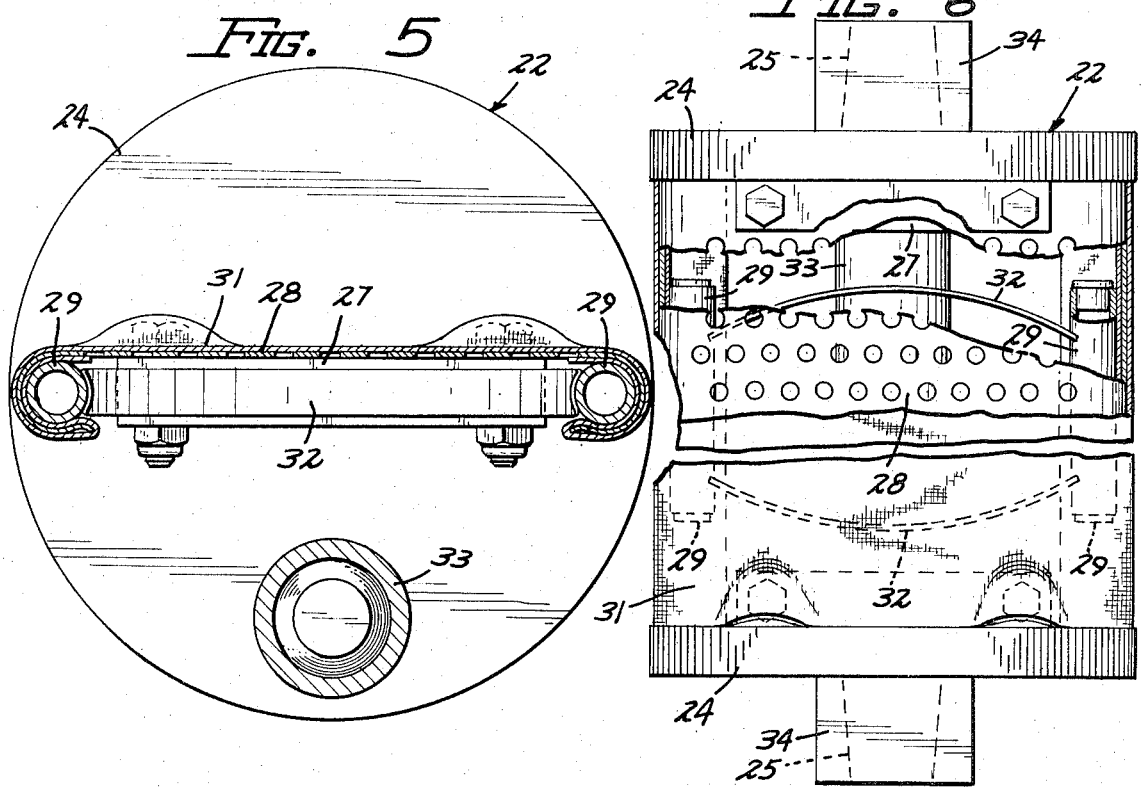
FIG. 5
FIG. 6

TRAY TURNOVER DEVICE

The invention is directed to tray turnover apparatus for conveying and discharging yeast raised bakery products in a raw dough state.

The conventional method of producing yeast raised bakery products involves formulation of unraised dough into pieces (e.g., doughnuts) which are placed onto trays mounted on a conveyor. The trays are conveyed to a proofing station, where the dough is raised under controlled environmental conditions. Following proofing, the trays are conveyed to a discharge area, where the dough pieces are unloaded into a cooking unit.

Because the yeast raised dough pieces are susceptible to collapse and are also somewhat sticky in the raw dough state, discharge of the dough pieces following the proofing step has long presented a problem. The problem is complicated by the fact that sticking of the dough is dependent on a number of factors and is therefore inconsistent, and also by the fact that the conveying apparatus must be used for various types of bakery products the raw dough forms of which have different sticking characteristics. The prior art includes a number of types of apparatus designed to discharge yeast raised dough pieces; but, to the best of my knowledge, none have been capable of satisfactorily discharging various types of bakery products under different sticking conditions.

My invention is the result of an endeavor to solve these problems and broadly comprises a plurality of sequentially conveyed tray turnover devices, means for turning the individual trays over at a controlled rotational velocity which can be varied for the type of bakery product and sticking condition, and means for maintaining the trays in an overturned position for a predetermined period of time to insure discharge of the dough pieces.

Specifically, each of the tray turnover devices includes a wheel member the revolvement of which causes the tray to turn about an essentially horizontal axis to its discharge position, and the turnover means consists of a disc or wheel member rotated by a variable speed motor which is positioned to rotatably engage the wheel member of the tray turnover device and thereby effect turning of the tray. Each tray turnover device also includes a land disposed for slidable engagement with a variable length land track when in the overturned position, thus maintaining the tray in its discharge position for a set period of time. A counter weight on each tray turnover device causes the tray to right itself after the land leaves the track.

The tray turnover devices themselves are also improved through the inclusion of cloth covers upon which the dough pieces are placed, and means for quickly and easily removing the covers for washing or discarding.

BRIEF DESCRIPTION OF THE DRAWINGS

FIG. 1 is a view in top plan of tray turnover apparatus embodying the invention principles, portions thereof being broken away;

FIG. 2 is a side elevation of the tray turnover apparatus with parts thereof broken away and portions shown in section;

FIG. 3 is an enlarged sectional view of the apparatus taken along the line 3—3 of FIG. 2 with portions broken away and shown in section;

FIG. 4 is an enlarged sectional view of the apparatus taken along the line 4—4 of FIG. 1 with portions broken away and shown in section;

FIG. 5 is an enlarged sectional view of a tray turnover device taken generally along the line 5—5 of FIG. 1; and FIG. 6 is a view in top plan of the tray turnover device with portions thereof broken away and shown in section.

DESCRIPTION OF THE PREFERRED EMBODIMENT

With initial reference to FIGS. 1 and 2, tray turnover apparatus embodying the inventive principles is represented generally by the numeral 11. Apparatus 11 includes a frame 12 having longitudinal side rails 13 interconnected by cross rails 14 (only one of which is shown) and a plurality of spaced leg members 15.

Mounted on the inside of each of the side rails 13 toward the left end of apparatus 11 is a support member 16 in which an idler sprocket 17 is journaled. Similar supports 18, are mounted on the inside face of two opposed leg members 15 to rotatably carry sprockets 19 as shown. Endless chains 21, driven by means not shown, engage the sprockets 17 and 19 to define conveying means for a plurality of tray turnover devices represented generally by the numeral 22. With additional reference to FIG. 3, the chains 21 include a plurality of pins 23 spaced in opposed relation to pivotally carry each of the tray turnover devices 22.

With specific reference to FIGS. 3–6, each of the tray turnover devices 22 comprises a pair of wheel members 24 each having a hub portion 25 constructed to receive a pin 23. As best shown in FIG. 3, the pin 23 is received at the center of wheel member 24 so that rotation of the tray turnover device 22 is balanced rather than eccentric.

Disposed on the inner face of each wheel 24 is a rectangular platform 27 to which a perforate screen or tray member 28 is bolted. Tray 28 extends from the inner face of one wheel member 24 to the other and defines the dough carrying portion of each tray turnover device 22. As best shown in the sectional view in FIG. 5, perforate tray 28 is essentially flat with leading and trailing edges which curve downwardly to receive and retain elongated tubes 29. The length of the tubes 29 is slightly shorter than the inner face to face dimension between wheel members 24, and their purpose is to removably secure a cloth cover 31 for the perforate tray 28. Cloth cover 31 is sufficiently wide to overlie virtually the entire length of tray 28, rising up and over the tray mounting bolts as shown in FIGS. 3 and 5. The length of cloth cover 31 enables it to be wrapped over the leading and trailing edges of perforate tray 28 and up into the slots which receive elongated tubes 29. Accordingly, with the cloth cover 31 so positioned, insertion of the tubes 29 into their respective receiving slots causes the cloth cover 31 to be drawn tightly over the tray 28 and retained in this position. Three spring clips 32 are used to hold tubes 29 in their respective retaining slots, each clip 32 having arcuately formed ends for mateable engagement with the tubes 29.

The cloth cover 31 provides a more sanitary surface for the dough pieces 30 and also resists sticking when the dough pieces are discharged. After a period of use, the cloth cover 31 is quickly and easily removed for washing or discarding by removal of the clips 32 and elongated tubes 29.

As best shown in FIGS. 3 and 5, each tray turnover device 22 includes another elongated tube 33 which is permanently retained between the respective wheel members 24 in a centered position below the perforate tray 28 to serve as a counter weight and maintain the tray in an upright position. With reference to FIG. 4, each of the wheel members 24 includes a land 34 which is used to maintain the tray turnover device 22 in an overturned position, as described in more detail below.

Generally speaking, the functional objective of apparatus 11 is to sequentially rotate each of the tray turnover devices 22 to a discharge position at a discharge area, to maintain the device 22 in the overturned position to insure discharge of the dough pieces 30, and to return the device to its normal upright position following discharge of the dough pieces 30. As shown in FIG. 2, the discharge area for apparatus 11 is a frying vat 35 into which the dough pieces 30 are discharged for cooking.

With reference to FIGS. 1–4, a plurality of L-shaped support brackets 36 are rigidly affixed to the side rails 13 in spaced, opposed pairs, projecting inwardly and downwardly. These brackets 36 offer support to the various structural components which effect turnover, maintain turnover and return the devices 22 in sequential fashion. A pair of rectangular support plates 37 are respectively affixed to the opposed support brackets 36 at the left end of apparatus 11. As best shown in FIGS. 2–4, an elongated guide 38 for each chain 21 is carried at one end by the rectangular support plate 37 and by succeeding support brackets 36 along its length. Chain guide 38 defines an elongated guide slot 39 sized to receive and guide the chain 21, the entrance end of the slot 39 diverging into a mouth portion to insure entry of chain 21 into the slot 39. Chain guides 38 prevent the chains 21 from sagging and also insure a smooth path of travel for the tray turnover devices 22.

With reference to FIG. 3, each of the support plates 37 also carries a horizontal tray guide 41, each of which comprises an elongated plate disposed horizontally with one edge abutting the inner face of chain guide 38. As best shown in FIG. 1, the inner edge of each tray guide 41 diverges in the direction of entry of the tray turnover devices 22 to channel the devices 22 into a centered position within the apparatus 11.

As shown in FIGS. 2 and 3, one of the support plates 37 has a pair of ears 42 projecting from its upper edge to which a vertical tray guide 43 is mounted. Tray guide 43 comprises a plate of relatively short length mounted in a vertical plane with its lower edge disposed for guiding engagement with the land 34 when the tray turnover device 22 is in an upright position. Flatness of the guiding edge of tray guide 43 and the top face of land 34 insures that each tray turnover device 22 is stabilized in the upright position. And that the initial point of contact is held constant from turnover device 22 to the next turnover device 22.

From the foregoing, it will be apparent that any undesired swinging, oscillating or undulating movement on the part of tray turnover devices 22 as they pass around sprockets 17 will be quickly stabilized by the combined effect of chain guide 38, horizontal tray guide 41 and vertical tray guide 43. This stabilized condition is necessary prior to the turning over of each device 22 in the dough discharge area.

The discharge area is generally defined by the position of tray turnover apparatus represented generally by the numeral 44. Apparatus 44 basically comprises a variable speed electric motor 45 which drives a polyurethane disc 46 through a gear reduction unit 47. Motor 45 is mounted on a horizontal support plate 48, which is in turn pivotally mounted by a pair of projecting ears to a vertical adjustment plate 49. Adjustment plate 49 faces a horizontal adjustment plate 51, with both adjustment plates being carried on the rectangular support plate 37 by means not shown. The adjustment plates 49 and 51 permit the desired vertical and horizontal positioning of polyurethane disc 46 with respect to the wheel member 24 of tray turnover device 22.

As best shown in FIG. 3, a stop member 52 is adjustably carried by the horizontal support plate 48 for abutting engagement with the vertical adjustment plate 49. The turnover disc 46 is maintained in a downwardly biased position by a spring 53 the tension of which is controlled by an adjustment bolt 54. Proper adjustment of the stop 52 and adjustment bolt 54 will effect the desired rotatable engagement of disc 46 with each wheel member 24 of the tray turnover devices 22.

With reference to FIGS. 1, 3 and 4, the chain guide 38 on the motor side of apparatus 11 carries a holding track 55 which comprises a pair of elongated plates arranged in face-to-face relation. Each of the plates of track 55 has an elongated slot formed therein through which mounting bolts 56 project. Thus, the plates are relatively slideable, and their combined length is adjustable. The top edge of each plate of holding track 55 is positioned for slidable engagement with the land 34 when the tray turnover device 22 is inverted to its dough discharge position. It will thus be appreciated that holding track 55 maintains each of the tray turnover devices 22 in its discharge position so long as the land 34 slidably engages the upper edge of the track plate.

After each tray turnover device 22 leaves the holding track 55, it must be returned to its normal upright position. The counter weight tube 29 is capable of performing this function if the device 24 is rotated slightly from the dough discharge position. To insure that the devices 22 return to their normal upright position, however, a tripping arm 57 is provided. As best shown in FIGS. 3 and 4, tripping arm 57 is mounted on one of the L-shaped support brackets 36, projecting inwardly and downwardly to a point where it will be struck by a counter weight tube 29 which is still in the discharge position. As best shown in FIG. 4, the mounting plate of tripping arm 57 has a pair of elongated horizontal slots 58 which permit its adjustment to a desired tripping point.

In operation, after the dough pieces 30 have raised sufficiently at a proofing station, they are moved on the tray turnover devices 22 by the conveying chains 21 to the apparatus 11 to be discharged into a frying vat 35 or the like. The tray turnover devices 22 enter the apparatus 11 by passing around idler sprocket 17, at which point they are immediately stabilized into a discharge readiness position by the combined effect of the chain guide 43. Following stabilization of the tray turnover device 22, the wheel member 24 on the motor side of apparatus 11 is rotatably engaged by the turnover disc 46, revolving it 180 degrees to the dough discharge position. The land 34 immediately engages and slides on the holding track 55 to hold device 22 in its inverted position over a predetermined length and period of time to insure discharge of each of the dough pieces 30. After the device 22 leaves holding track 55, its counter weight tube 29 strikes the tripping arm 57, returning it to the normal upright position.

To accommodate all types of dough products under various sticking conditions, the rotational speed of the disc 46 can be varied so that the turnover speed of each device 22 is proper. Further, the length of holding tract 55 is adjustable to insure that each tray turnover device 22 is maintained in the turnover position for a sufficient length of time for discharge of the dough pieces 30 to occur. Further, the point of contact between disc 46 and wheel member 24 is adjustable to control the time required for one half (180°) revolution of wheel 24. The tripping arm 57 is adjusted in accordance with the length of holding track 55 so that return of the devices 22 to their normal upright position is accomplished only after all dough pieces 30 have been discharged.

It will also be appreciated that the nature of turnover apparatus 11 permits the tray turnover devices 22 to rotate about a central rather than an eccentric axis, as is common in prior art devices. This keeps the dough carrying tray at the same elevation in both upright and discharge positions, which results in a minimum dropping distance for the dough pieces. The central pivot axis also keeps tray movement to a minimum, and obviates momentum forces that would otherwise arise from movement from an eccentric tray position.

I claim:

1. In bakery apparatus including means for advancing a tray of bakery products, invertible about a first axis thereof, in a direction orthogonal to the first axis to a location where the products are unloaded by inverting the tray, the improvement which comprises:
   a. a disc rotatable about a second axis parallel to said first axis;
   b. variable speed drive means independent of the tray advancing means for causing rotation of said disc at any speed within a predetermined range;
   c. resilient means mounting said drive means for limited independent motion of said second axis transverse to itself and to the direction of movement of said tray;
   d. and a wheel member carried by said tray concentrically with the axis of inversion thereof, and positioned so that the advance of said tray brings said member into a position of tangential contact with said disc, so that further advance of the tray causes said independent motion while said disc and said member remain in contact for a period determined by the rate of movement of the tray.

2. In bakery apparatus including means for advancing a tray of bakery products, invertible about a first axis thereof, in a direction orthogonal to the first axis, from a first location where the products are loaded on the tray to a second location where the products are unloaded from the tray, the improvement which comprises:
   a. a disc rotatable about a second axis parallel to said first axis;
   b. variable speed drive means independent of the tray advancing means for causing rotation of said disc at any speed within a predetermined range;
   c. resilient means adjustably mounting said drive means for limited independent motion of said axis transverse to itself and to the direction of movement of said tray;
   d. and a wheel member carried by said tray concentrically with the axis of inversion thereof, and positioned so that the advance of said tray brings said member into a position, of tangential contact with said disc, at which the distance between said first and second axes is greater than the component thereof normal to the direction of motion of the tray, so that further advance of the tray causes said independent motion while said disc and said member remain in contact for a period determined by the rate of movement of the tray and the adjusted position of said resilient means.

3. Apparatus according to claim 1 in which there are a plurality of said trays, each of which carries one of said wheel members, and advance of the trays brings the wheel members thereof sequentially into said position of tangential contact with said disc.

4. Apparatus according to claim 1 together with means positively initiating return of the tray to its uninverted position upon still further advance of the tray.

5. Apparatus according to claim 4 in which the tray includes an eccentrically disposed elongated member extending essentially parallel to the inversion axis of the tray, and the return initiating means comprises a stationary tripping member disposed to contact the elongated member of each tray which remains inverted.

* * * * *